United States Patent
Fujita

(10) Patent No.: US 6,992,795 B1
(45) Date of Patent: Jan. 31, 2006

(54) ELECTROPHOTOGRAPHIC APPARATUS AND ELECTROPHOTOGRAPH IMAGE PROCESSING METHOD

(75) Inventor: Toru Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/513,851

(22) Filed: Feb. 25, 2000

(30) Foreign Application Priority Data

| Feb. 25, 1999 | (JP) | ................................... 11-048563 |
| Nov. 19, 1999 | (JP) | ................................... 11-330292 |

(51) Int. Cl.
*H04N 1/40* (2006.01)

(52) U.S. Cl. ........................................ 358/1.9; 358/3.2

(58) Field of Classification Search ................. 358/1.9, 358/3.1, 3.09–3.18, 3.24, 3.26, 3.2
See application file for complete search history.

(56) References Cited

U.S. PATENT DOCUMENTS

| 4,926,248 | A | 5/1990 | Kobayashi et al. ........... 358/75 |
| 5,187,495 | A | 2/1993 | Tanimoto et al. ........... 346/108 |
| 5,189,441 | A | 2/1993 | Fukui et al. ................. 346/160 |
| 5,339,171 | A | 8/1994 | Fujisawa et al. ............ 358/458 |
| 5,450,212 | A | 9/1995 | Asada ........................ 358/445 |
| 5,790,272 | A | * 8/1998 | Goto et al. ................. 358/3.24 |
| 6,011,878 | A | * 1/2000 | Ushida et al. .............. 382/298 |
| 6,266,154 | B1 | * 7/2001 | Allen ......................... 358/3.06 |
| 6,519,056 | B1 | * 2/2003 | Hattori ....................... 358/3.09 |

FOREIGN PATENT DOCUMENTS

| EP | 0 527 574 A1 | 2/1993 |
| EP | 0 847 188 A2 | 6/1998 |
| EP | 1 026 878 A2 | 8/2000 |

* cited by examiner

*Primary Examiner*—Thomas D. Lee
*Assistant Examiner*—Stephen Brinich
(74) *Attorney, Agent, or Firm*—Sughrue Mion, PLLC

(57) ABSTRACT

An electrophotographic apparatus which represents halftone through use of halftone spots formed of a plurality of dots, to thereby reproduce an image and which forms a virtual development region of a predetermined area at a predetermined location within dots by means of exposure of a photosensitive drum to a beam and which reproduces a real development region by causing toner to adhere to the virtual development region. In order to prevent an area narrower than a predetermined width from arising in the virtual development region, an area which is originally designated to become narrow is formed into an area of certain width, to thereby prevent formation of a much narrower real development region, which would otherwise be caused by an excessively low surface potential of the narrow area. The area of halftone spots is partially increased in the virtual development region at a single gray-scale level.

11 Claims, 13 Drawing Sheets

ANGLES OF CMYK SCREENS

FIG. 3

EXAMPLE OF CONVERSION TABLE

21. PATTERN MATRIX

| 7 | 5 | 3 | 8 |
|---|---|---|---|
| 3 | 1 | 1 | 6 |
| 5 | 2 | 2 | 4 |
| 7 | 4 | 6 | 8 |

22. γ TABLE (GRAY-SCALE LEVEL OF PATTERN vs. PULSE WIDTH)

| HALFTONE | 1 | 2 | 3 | 4 | 5 | 6 | 7 | 8 |
|---|---|---|---|---|---|---|---|---|
| 0 ~ 63 | 0 ~ 255 | 0 ~ 255 | 0 ~ 0 | 0 ~ 0 | 0 ~ 0 | 0 ~ 0 | 0 ~ 0 | 0 ~ 0 |
| 64 ~ 127 | 255 ~ 255 | 255 ~ 255 | 0 ~ 255 | 0 ~ 0 | 0 ~ 0 | 0 ~ 0 | 0 ~ 0 | 0 ~ 0 |
| 128 ~ 191 | 255 ~ 255 | 255 ~ 255 | 255 ~ 255 | 255 ~ 255 | 0 ~ 255 | 0 ~ 0 | 0 ~ 0 | 0 ~ 0 |
| 192 ~ 255 | 255 ~ 255 | 255 ~ 255 | 255 ~ 255 | 255 ~ 255 | 255 ~ 255 | 255 ~ 255 | 0 ~ 255 | 0 ~ 255 |

10. INPUT DATA (HALFTONE DATA)

| $P_{00}$ | $P_{01}$ | $P_{02}$ | $P_{03}$ |
|---|---|---|---|
| $P_{10}$ | $P_{11}$ | $P_{12}$ | $P_{13}$ |
| $P_{20}$ | $P_{21}$ | $P_{22}$ | $P_{23}$ |
| $P_{30}$ | $P_{31}$ | $P_{32}$ | $P_{33}$ |

VIRTUAL DEVELOPMENT REGION AND REAL DEVELOPMENT REGION
FIG. 7 (A)  VIRTUAL DEVELOPMENT REGION
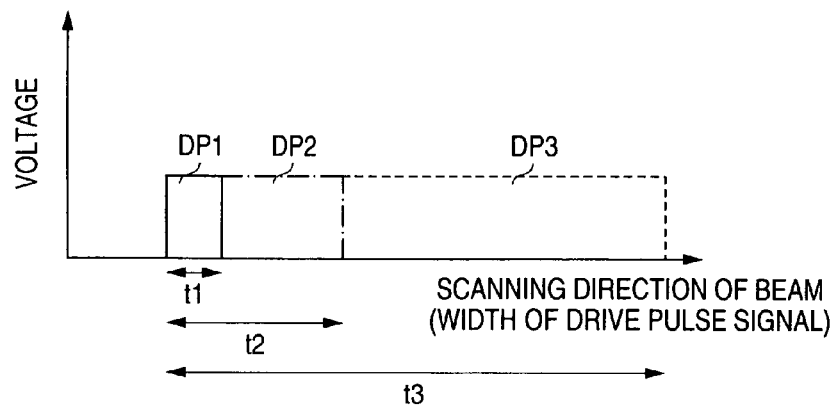
FIG. 7 (B)  LATENT IMAGE
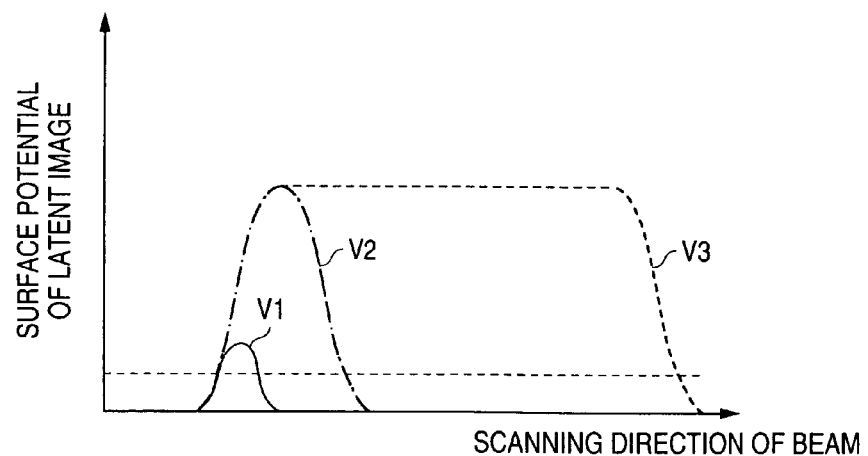
FIG. 7 (C)  REAL DEVELOPMENT REGION
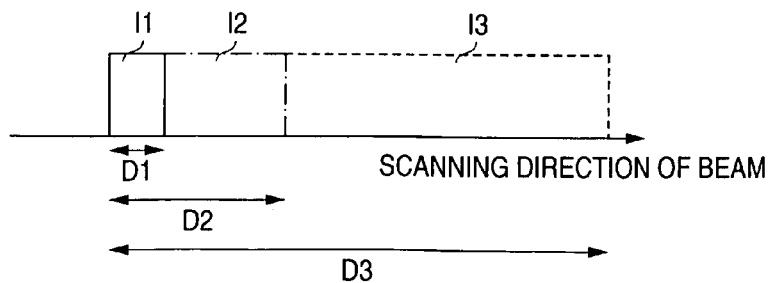

EXAMPLES OF VIRTUAL DEVELOPMENT REGIONS
AND REAL DEVELOPMENT REGIONS
FIG. 8 (A) SP2
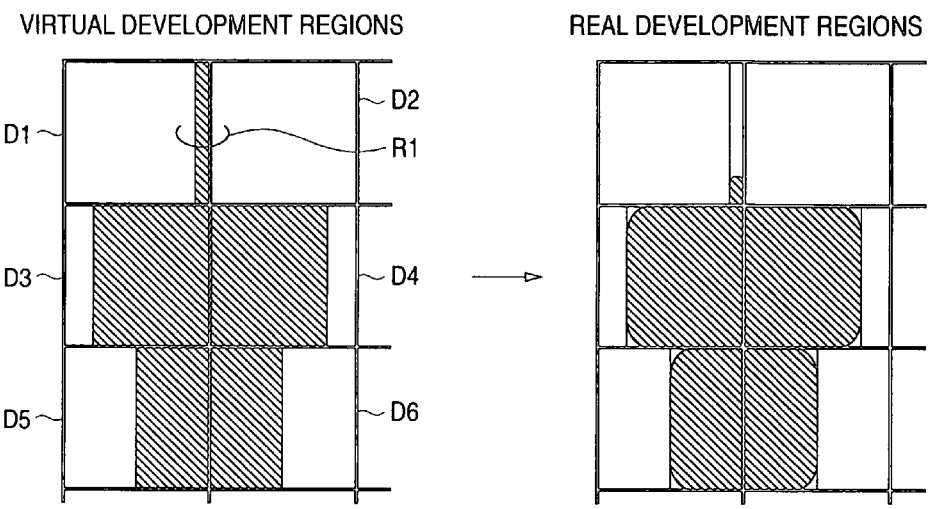
FIG. 8 (B) SP1
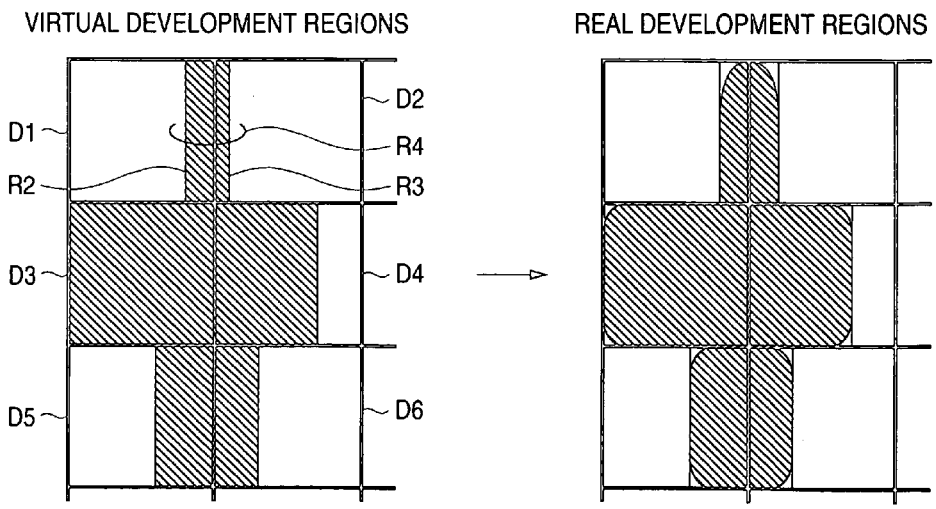

EXAMPLE OF AMOUNT OF CORRECTION

FIG. 11

| CASE | POSITION DATA 66P | | | TOTAL PULSE WIDTH |
|---|---|---|---|---|
| | prev (PREVIOUS DOT) | curr (CURRENT DOT) | next (NEXT DOT) | |
| 1 | RIGHT | RIGHT | RIGHT | c |
| 2 | RIGHT | RIGHT | ENTIRE | c + n |
| 3 | RIGHT | RIGHT | LEFT | c + n |
| 4 | RIGHT | LEFT | RIGHT | p + c |
| 5 | RIGHT | LEFT | ENTIRE | p + c |
| 6 | RIGHT | LEFT | LEFT | p + c |
| 7 | RIGHT | ENTIRE | RIGHT | p + c |
| 8 | RIGHT | ENTIRE | ENTIRE | p + c + n |
| 9 | RIGHT | ENTIRE | LEFT | p + c + n |
| 10 | LEFT | RIGHT | RIGHT | c |
| 11 | LEFT | RIGHT | ENTIRE | c + n |
| 12 | LEFT | RIGHT | LEFT | c + n |
| 13 | LEFT | LEFT | RIGHT | c |
| 14 | LEFT | LEFT | ENTIRE | c |
| 15 | LEFT | LEFT | LEFT | c |
| 16 | LEFT | ENTIRE | RIGHT | c + n |
| 17 | LEFT | ENTIRE | ENTIRE | c + n |
| 18 | LEFT | ENTIRE | LEFT | c + n |
| 19 | ENTIRE | RIGHT | RIGHT | c |
| 20 | ENTIRE | RIGHT | ENTIRE | c + n |
| 21 | ENTIRE | RIGHT | LEFT | c + n |
| 22 | ENTIRE | LEFT | RIGHT | p + c |
| 23 | ENTIRE | LEFT | ENTIRE | p + c |
| 24 | ENTIRE | LEFT | LEFT | p + c |
| 25 | ENTIRE | ENTIRE | RIGHT | p + c |
| 26 | ENTIRE | ENTIRE | ENTIRE | p + c + n |
| 27 | ENTIRE | ENTIRE | LEFT | p + c + n |

(AMOUNT OF CORRECTION TO BE APPLIED TO CURRENT DOT)
= (PULSE WIDTH RELATING TO CURRENT DOT) ÷ (TOTAL PULSE WIDTH)
× (AMOUNT OF CORRECTION TO BE APPLIED TO TOTAL PULSE WIDTH) ··· (1)

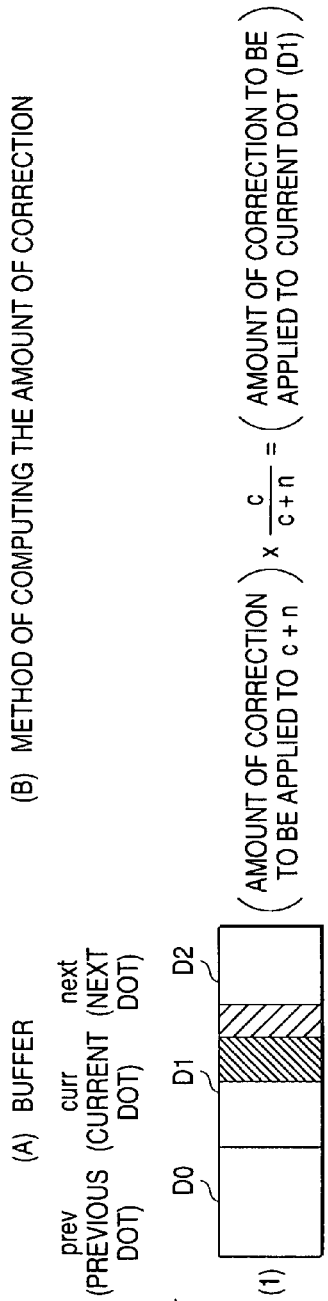
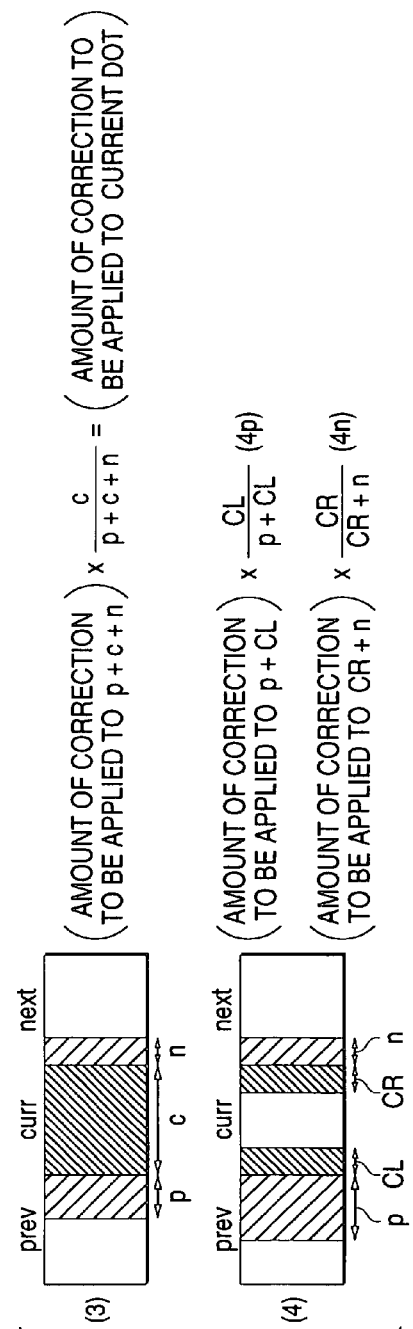
FIG. 12
FIG. 13

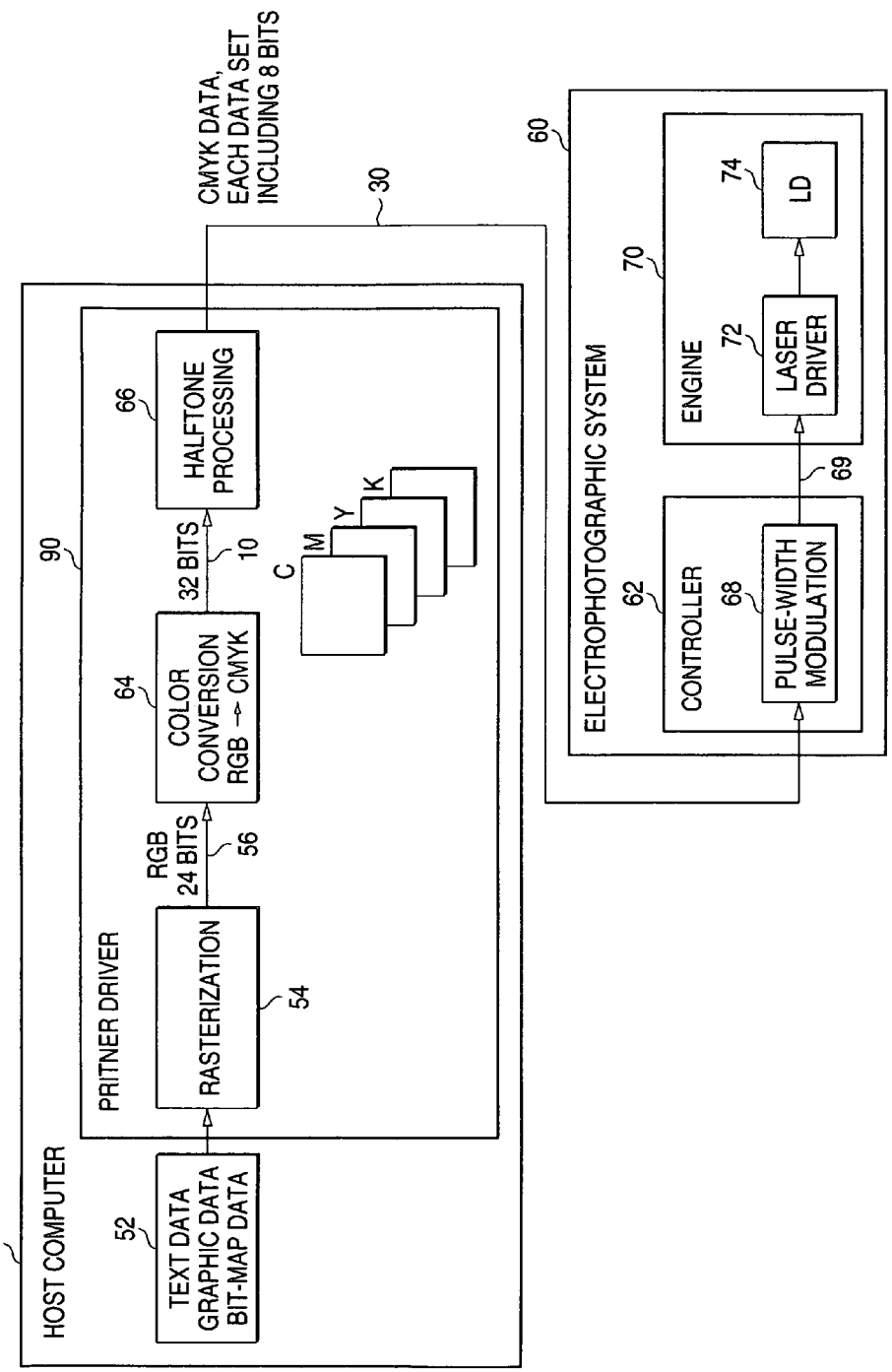

ELECTROPHOTOGRAPHIC APPARATUS AND ELECTROPHOTOGRAPH IMAGE PROCESSING METHOD

BACKGROUND OF THE INVENTION

1. Field of the Invention

The present invention relates to an electrophotographic image processing method and an electrophotographic apparatus for carrying out the method, wherein halftone processings are performed through use of halftone spots each formed of a plurality of dots, as well as to a recording medium having recorded thereon a program to be used for carrying out the image processing method. In this specification, the word "dot" implies defines "pixel" as a unit cell in electrophotographic apparatuses.

The present application is based on Japanese Patent Applications No. Hei. 11-48563 and 11-330292, which are incorporated herein by reference.

2. Description of the Related Art

In an electrophotographic apparatus, such as a color printer or a color copier, a color image is reproduced by utilization of cyan toner, magenta toner, yellow toner, and black toner. Particularly, among color printers, some page printers—which form a latent image on a photosensitive drum by utilization of a laser beam, develop the latent image by use of charged toner, and transfers an image formed from the thus developed toner onto transfer paper—an change an area to be exposed by the laser beam in various manners and within a region of dots (hereinafter referred to as a "dot region"). Thus even when the number of dots per unit area is small, those page printers can reproduce a color image with high resolution and high gradation.

In such a color electrophotographic apparatus, a dithering method has been widely utilized as the binary-coding technique for reproducing the halftone of a gray-scale image. According to the dithering method, by reference to conversion tables which are called dither matrices or threshold-value matrices and which define the correspondence between halftone data and image reproduction data, a determination is made as to whether color spot is displayed in each of dot or not. A dot is "ON" when color spot is displayed and "OFF" when color spot is not displayed. Halftone spots are produced by one dot or some adjacent dots turning "ON", and halftones of the images are reproduced on the basis of the sizes of halftone spots.

Dots are arranged in the direction of primary scanning in which a laser beam is moved for scanning (hereinafter referred to simply as a "primary-scanning direction") and in the direction of secondary scanning in which transfer paper is fed (hereinafter referred to simply as a "secondary-scanning direction"). As some dots become "ON" and thus form the "core of the growth" of halftone spots. As the gray-scale level of the halftone data is increased further, the number of "ON" dots is eventually increased, thus gradually enlarging the size of halftone spots.

Through use of a multivalued dithering method which is an extension of the dithering method, toner can be adhered in only a predetermined area of the dot region. The multi-valued dithering method enables reproduction of an image having a higher gray-scale level. As mentioned above, even in the case of an electrophotographic apparatus as typified by a laser printer and uses a small number of dots per unit area (for example, 600 dpi), the multivalued dithering method enables reproduction of an image with high resolution and high gradation.

Such an electrophotographic apparatus encounters a problem of stripes or inconsistencies (a stripe pattern oriented in a certain direction) arising in a reproduced image. The stripes or inconsistencies are attributable to various reasons, and diagnosis and solution of all the reasons for the stripes or inconsistencies is difficult.

FIG. 1 is an illustration showing the combination of the angle of a cyan screen, the angle of a magenta screen, the angle of a yellow screen, and the angle of black screen, which has conventionally and widely been used in an electrophotographic apparatus of the background art. As shown in the drawing, according to the conventional technique, the angles of four color screens are set such that the angle of the yellow (Y) screen is set to 0°; the angle of the cyan (C) screen [or the angle of the magenta (M) screen] is set to 15°; the angle of the black (K) screen is set to 45°; and the angle of the magenta (M) screen [or the angle of the cyan (C) screen] is set to 75°. It is also known that, if the screen angles of the halftone spots are shifted in order to prevent chromatic misregistration, a so-called moiré pattern appears. It has empirically been acknowledged that a shift of angle of about 30° between two color screens is optimal for increasing the spatial frequency of the moiré pattern, to thereby render the moiré pattern inconspicuous. Among the four colors, yellow is the least noticeable to the human eye. Therefore, the angles of color screens other than the yellow screen; that is, the angle of the cyan screen, the angle of the magenta screen, and the angle of the black screen, are shifted from one another by 30°. Further, the angle of the black screen, which is most noticeable to the human eye, is set to 45°, so as be most distant from a longitudinal angle of 0° and a horizontal angle of 90°, which are easily recognized by the human eye. The angle of the cyan screen is set to 15°, and the angle of the magenta screen is set to 75°, or vice versa. As mentioned above, since yellow is least noticeable to the human eye, the angle of the yellow screen is set to 0°.

The foregoing method is employed in order to prevent occurrence of stripes or inconsistencies, which would otherwise be caused by shifting screen angles of halftone spots from each other. Under this method, stripes or inconsistencies, which would be caused by a moiré pattern, are prevented by means of shifting angles of color screens by about 30°.

There may be a case where stripes or inconsistencies are caused by a reason other than that mentioned previously. A predetermined area within dots is developed through use of the multivalued dithering method, to thereby set the centroid of the halftone spot to an arbitrary position. This technique is described in detail in Japanese Patent Application No. Hei. 11-28666 which is incorporated herein by reference. Under this method, there may be a case where only the portion of the dots of the halftone spot where narrow dots are present is developed.

Such a narrow area is formed as a result of a photosensitive drum having been exposed to a laser beam for a short period of time, and hence the resultant latent image of the narrow area has an insufficient surface potential. Accordingly, the toner adhering to such a latent image is developed to a poor extent, and the area which is actually developed through use of toner tends to become much narrower. As a result, even in a developed image having a single gray-scale level, variations or inconsistencies arise in the area of halftone spots constituting the image. For example, stripes or variations, which would be caused by variations in the area of halftone spots, arise in an image in which a bright color is to be reproduced over a certain area.

SUMMARY OF THE INVENTION

The present invention is aimed at providing an electrophotographic image processing method and an electrophotographic apparatus which prevent occurrence of stripes or inconsistencies, as well as a recording medium having recorded thereon a program of the electrophotographic image processing method.

The present invention is also aimed at providing an electrophotographic image processing method and an electrophotographic apparatus, both being capable of preventing occurrence of stripes or inconsistencies which would otherwise be caused by a variation in the area of halftone spots with respect to a single gray-scale level, as well as a recording medium having recorded thereon a program for carrying out the electrophotographic image processing method.

To these ends, the present invention provides an electrophotographic apparatus which represents halftone through use of halftone spots each formed of a plurality of dots, to thereby reproduce an image and which forms a virtual development region of a predetermined area at a predetermined location within dots by means of exposure of a photosensitive drum to a beam and which reproduces a real development region by causing toner to adhere to the virtual development region. In order to prevent an area narrower than a predetermined width from arising in the virtual development region, an area which is originally designated to become narrow is formed into an area of certain width, to thereby prevent formation of a much narrower real development region, which would otherwise be caused by an excessively low surface potential of the narrow area. Thus, according to the present invention, the area of halftone spots is partially increased in the virtual development region at a single gray-scale level. In the present invention, with consideration to the phenomenon that a narrow development region becomes much narrower after printing, a virtual development region corresponding to a narrow development region in halftone spots is set to be greater than a theoretical width. Accordingly, in the virtual development region, halftone spots having a narrow development region become larger in area than halftone spots lacking a narrow development region. As a result, variations arise in the area of halftone spots at a single gray-scale level. In contrast with the case of halftone spots of the virtual development region, variation in the area of halftone spots of the actual development region is prevented.

To achieve this effect, the present invention provides an electrophotographic apparatus which utilizes toner of a plurality of colors and represents a halftone of each color through use of a halftone spot formed from a plurality of dots, to thereby reproduce an image, the apparatus comprising:

a halftone processing section which produces image reproduction data pertaining to the dots for respective colors on the basis of halftone data pertaining to respective colors, by reference to a conversion table which is formed so as to correspond to the dots and defines the correspondence between the halftone data pertaining to respective colors and image reproduction information; and an image reproduction engine which produces a latent image by radiation of a beam onto a virtual development region within the dots, the region corresponding to the image reproduction data in terms of area and location and causes the toner to adhere to the latent image, to thereby form a real development region, wherein areas of said respective halftone spots of the virtual development region with respect to a single halftone level differs at least partially.

The aim is also achieved by means of an image processing method by which the halftone processing operation is performed, and a recording medium having recorded thereon a program for carrying out the image processing method.

Features and advantages of the invention will be evident from the following detailed description of the preferred embodiments described in conjunction with the attached drawings.

BRIEF DESCRIPTION OF THE DRAWINGS

In the accompanying drawings:

FIG. 3 is a diagram showing examples of conversion tables;

FIG. 7(A), FIG. 7(B) and FIG. 7(C) show graphs for describing the relationship between a virtual development region and a real development region;

FIG. 8(A) and FIG. 8(B) are illustrations showing examples of virtual development regions and actual development regions;

FIG. 11 is a table showing an algorithm for detecting the total width of a pulse signal relating to scanning adjacent dots used by a pulse-width correction processing section;

FIG. 12 shows illustrations for describing a method of determining the amount of correction according to Equation (1) by reference to the table shown in FIG. 11;

FIG. 13 is an illustration for describing a method of determining the amount of correction according to Equation (1) by reference to the table shown in FIG. 11; and FIG. 14 is a block diagram showing the configuration of another electrophotographic system.

DETAILED DESCRIPTION OF THE PREFERRED EMBODIMENTS

An embodiment of the invention will be described hereinbelow by reference to the accompanying drawings. However, the embodiment shall not limit the technological scope of the invention.

Figure 2:
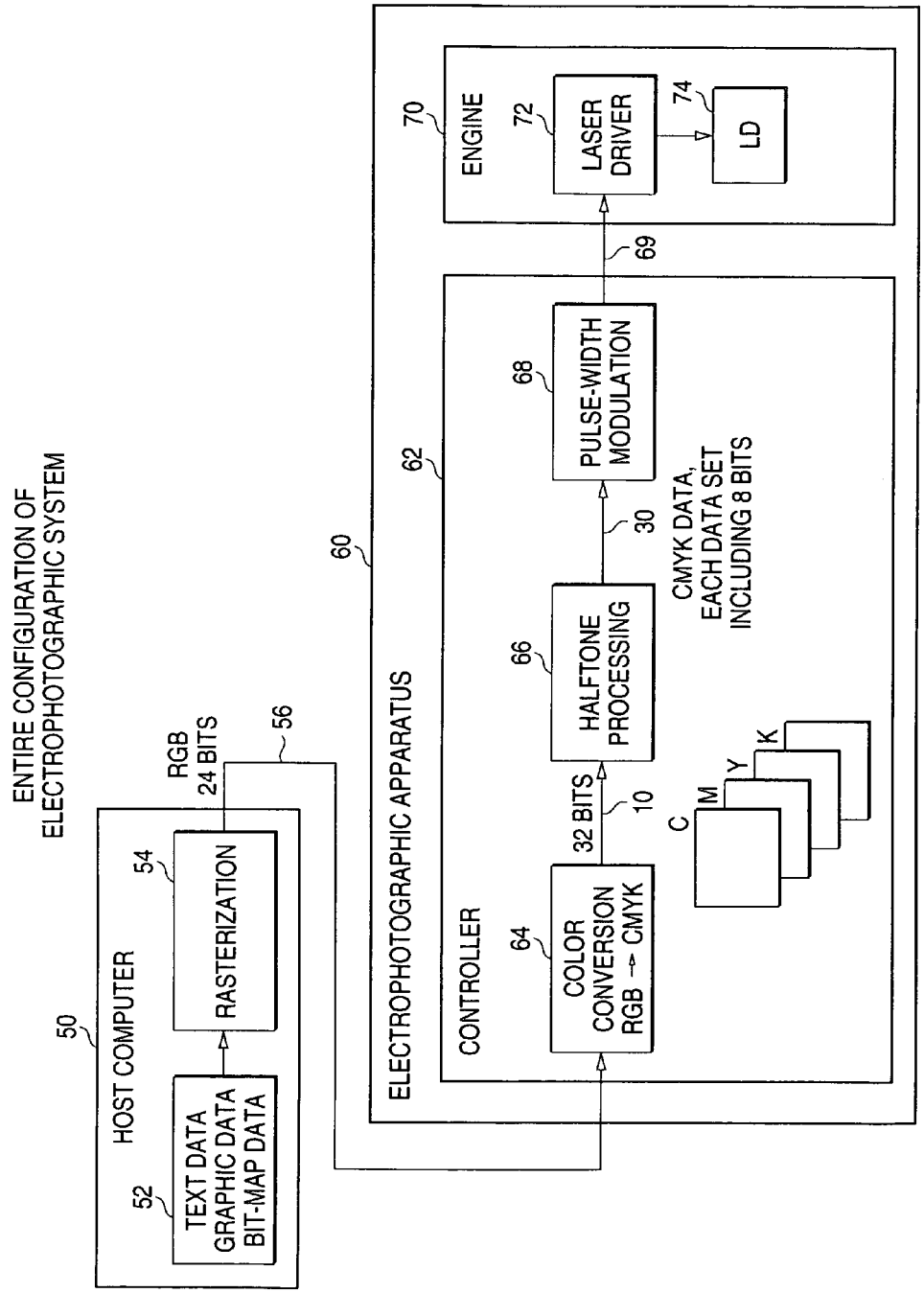
FIG. 2 is a block diagram showing the overall configuration of an electrophotographic system according to an embodiment of the present invention.

FIG. 2 is a block diagram showing the overall configuration of an electrophotographic system according to an embodiment of the present invention. In this embodiment, a host computer 50 produces image data 56 comprising RGB halftone data sets (each data set including eight bits, and the halftone data comprising a total of 24 bits). The RGB halftone data are delivered to an electrophotographic apparatus 60, such as a page printer. On the basis of supplied image data 56, the electrophotographic apparatus 60 reproduces a color image. The electrophotographic apparatus 60 comprises a controller 62 and an engine 70. The controller 62 processes an image and supplies laser-diode drive data 69 to the engine, and the engine 70 reproduces an image according to the drive data 69.

By means of an application program 52, such as a word processing program or a graphic tool, the host computer 50 produces text data, graphic data, and bit-map data. The data sets produced by the application program 52 are rasterized by means of a rasterizing driver 54 installed in the host computer 50. The thus-rasterized data sets are converted into the image data 56, each pixel or dot of which comprises respective RGB halftone data sets.

The electrophotographic apparatus 60 is provided with an unillustrated built-in microprocessor, and the microprocessor, in combination with a control program installed therein, constitutes a controller 62, which includes a color conversion section 64, a halftone processing section 66, and a pulse-width modulation section 68. A rasterization section may be provided within the controller 62. Further, the engine 70; e.g., a laser driver 72, activates a laser diode 74 for drawing an image on the basis of the drive data 69. Although the engine 70 comprises a photosensitive drum, a transfer belt, and a drive section for driving the photosensitive drum and the transfer belt, these elements are omitted from FIG. 2. A laser beam emitted from the laser diode 74 is scanned across and radiated onto a portion of the area on an unillustrated photosensitive drum, to thereby form on the photosensitive drum a latent image having a certain surface potential. Charged toner is caused to adhere to the latent image, and the toner is transferred to print paper by way of a transfer belt. Eventually, an image is developed.

The color conversion section 64 provided within the controller 62 converts the RGB halftone data 56 that are supplied for each dot into CMYK halftone data 10 which are complementary to the RGB data. In the CMYK halftone data 10, each color halftone data set comprises 8 bits and a maximum of 256 gray-scale tones. The color conversion section 64 converts the RGB halftone data 56 for each dot into the halftone data 10 for each plane dot of the respective CMYK colors. Consequently, the halftone processing section 66 is supplied with the halftone data 10 corresponding to a plane dot of the respective color.

The halftone processing section 66 produces the image reproduction data 30, which represent halftones, by utilization of, e.g., a multivalued dithering method. More Specifically, by reference to a previously-prepared conversion table defining the correspondence between halftone data and image reproduction data, the halftone processing section 66 produces, from the halftone data 10 for each dot, image reproduction data 30 for each dot. Thus, the image reproduction data 30 comprise data pertaining to the location of the region of each dot to be developed and data pertaining to the extent to which the region is to be developed.

FIG. 3 is a diagram showing an example of a conversion table. As described by reference to FIG. 2, the conversion table is recorded in memory which is referred by the halftone processing section 66 of the electrophotographic apparatus 60. The conversion table example shown in FIG. 3 comprises, so as to correspond to dots of the input data 10 including halftone data, a pattern matrix 21 whose elements are assigned index numbers of a γ table to be referred to, and a γ table 22 corresponding to the index numbers assigned to the elements of the pattern matrix 21.

For example, at the time of processing of halftone data a P00 of the input data 10, the halftone processing section 66 refers to corresponding data provided in the pattern matrix 21 and a conversion table of the γ table 22 corresponding to index number "7." An input of halftone data P00 is converted into image reproduction data representing the position and area of a virtual development region within dots.

The pattern matrix 21 shown in FIG. 3 is an example of a matrix having four rows and four columns. Index numbers corresponding to eight types of γ tables are assigned to 16 dots of the pattern matrix 21. In the example of the γ table 22 shown in FIG. 3, according to the γ tables assigned index numbers 1 and 2, an output rises up to a 256-level gray scale in response to an input of low gray-scale level. According to the γ tables assigned index numbers 3 and 4 and the γ tables assigned index numbers 5 and 6, an output rises in response to an input of intermediate gray-scale level. According to the γ table assigned index numbers 7 and 8, an output rises when an input is of high gray-scale level.

Figure 4:
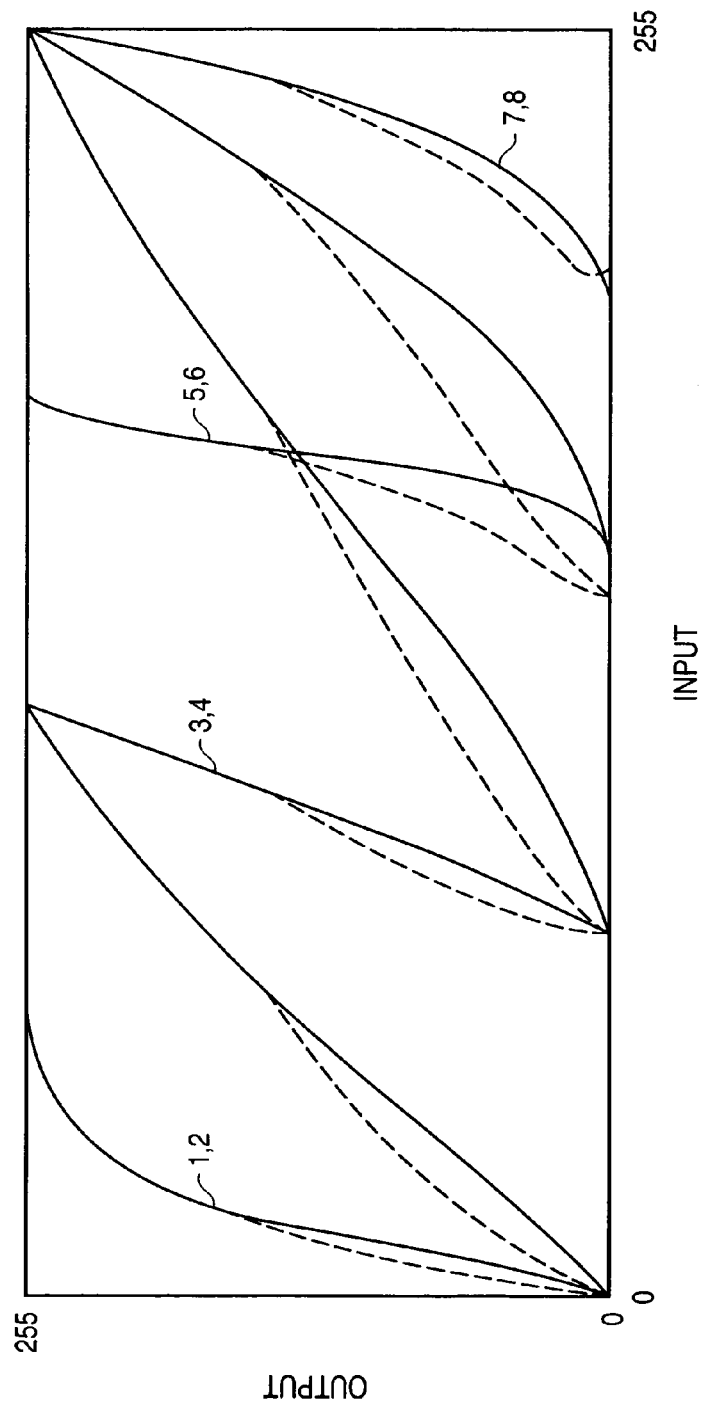
FIG. 4 is a graph showing a $\gamma$ table, in which the horizontal axis represents an input and the vertical axis represents an output.

FIG. 4 is a graph showing the γ table, wherein the horizontal axis represents an input and the vertical axis represents an output. As mentioned previously, according to the γ tables 1 and 2, an output rises up to a 256-level gray scale. According to the γ tables 3, 4, 5, and 6, an output rises in response to an input of intermediate gray-scale level. Further, according to the γ tables 7 and 8, an output rises in response to an input of high gray-scale level. FIG. 4 shows γ tables other than the foregoing γ tables. In a case where an image is developed on the basis of the image reproduction data obtained by reference to any one of those γ tables, the dots assigned the index numbers 1 and 2 grow greatly in the development region even when the input data 10 are of comparatively low gray-scale-level. In contrast, the dots assigned the index numbers 7 and 8 grow in the development region when the input data 10 are of comparatively high gray-scale-level.

Of the γ tables shown in FIG. 4, the γ tables designated by solid lines correspond to ideal γ tables, and γ tables designated by broken lines correspond to corrected γ tables, which will be described later.

Figure 5:
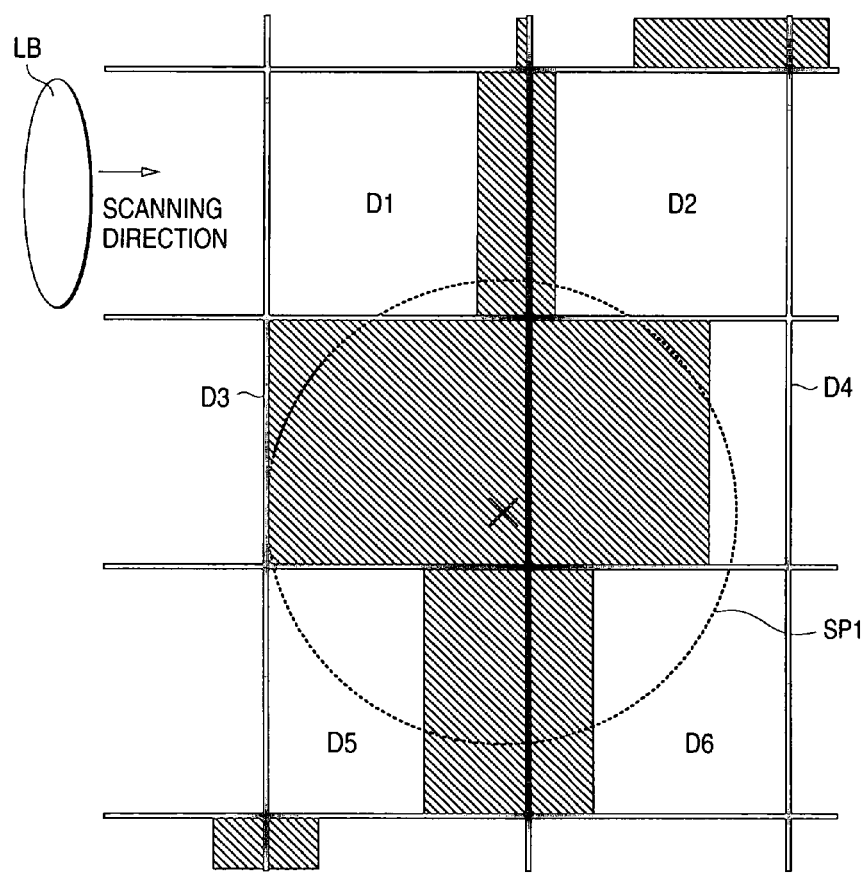
FIG. 5 is a diagram showing a virtual development region within a dot region.

FIG. 5 shows a virtual development region in dots. FIG. 5 shows a virtual development region embodied by hatching six adjacent dots D1 to D6. The engine 70 provided in the electrophotographic apparatus 60 forms a latent image by means of radiating a laser beam onto a photosensitive drum. As shown in FIG. 5, a laser beam LB is moved so as to scan across dots in the horizontal direction. The beam LB is radiated onto dots within the virtual development region and is deactivated (i.e., placed in a blanking state) in the area other than the virtual development region. The beam LB is radiated onto the virtual development regions in dots hatched in FIG. 5, whereby the surface potential of the thus-exposed virtual development region becomes high and latent images are formed.

In the area of dot D1, a laser beam is radiated onto a region encompassing approximately the rightmost one-fourth of the dot (hereinafter called "rightmost one-fourth region"). In the area of dot D2, the laser beam is radiated onto a region encompassing approximately the leftmost one-tenth of the dot D2. The entirety of a dot D3 is exposed to the laser beam LB. The laser beam is radiated onto a region encompassing approximately the leftmost two-thirds of the dot D4. Similarly, the laser beam is radiated onto a region encompassing approximately the rightmost two-fifths of a dot D5, and the laser beam is radiated onto a region encompassing approximately the leftmost one-fourth region of a dot D6.

When the photosensitive drum is exposed to the laser beam LB as exemplified and shown in FIG. 5, latent images having a high surface potential are formed in the exposed virtual development regions, and the toner adheres to the virtual development regions. For example, the halftone spot finally transferred to print paper assume a geometry SP1 indicated by broken lines shown in FIG. 5. As a result of adjustment of the position and area of the virtual development region in dots, the centroid (center) of the halftone spot SP1, which has grown from a plurality of dots, is placed at an arbitrary position shown by "X" in FIG. 5 without regard to the arrangement of dots or a dot pitch.

As mentioned above, the centroid of a halftone spot comprising the plurality of dots can be controlled to an arbitrary position regardless of the arrangement of dots or a dot pitch, through appropriate adjustment of the position and area of a development region within dots by utilization of the multivalued dithering method.

Figure 6:
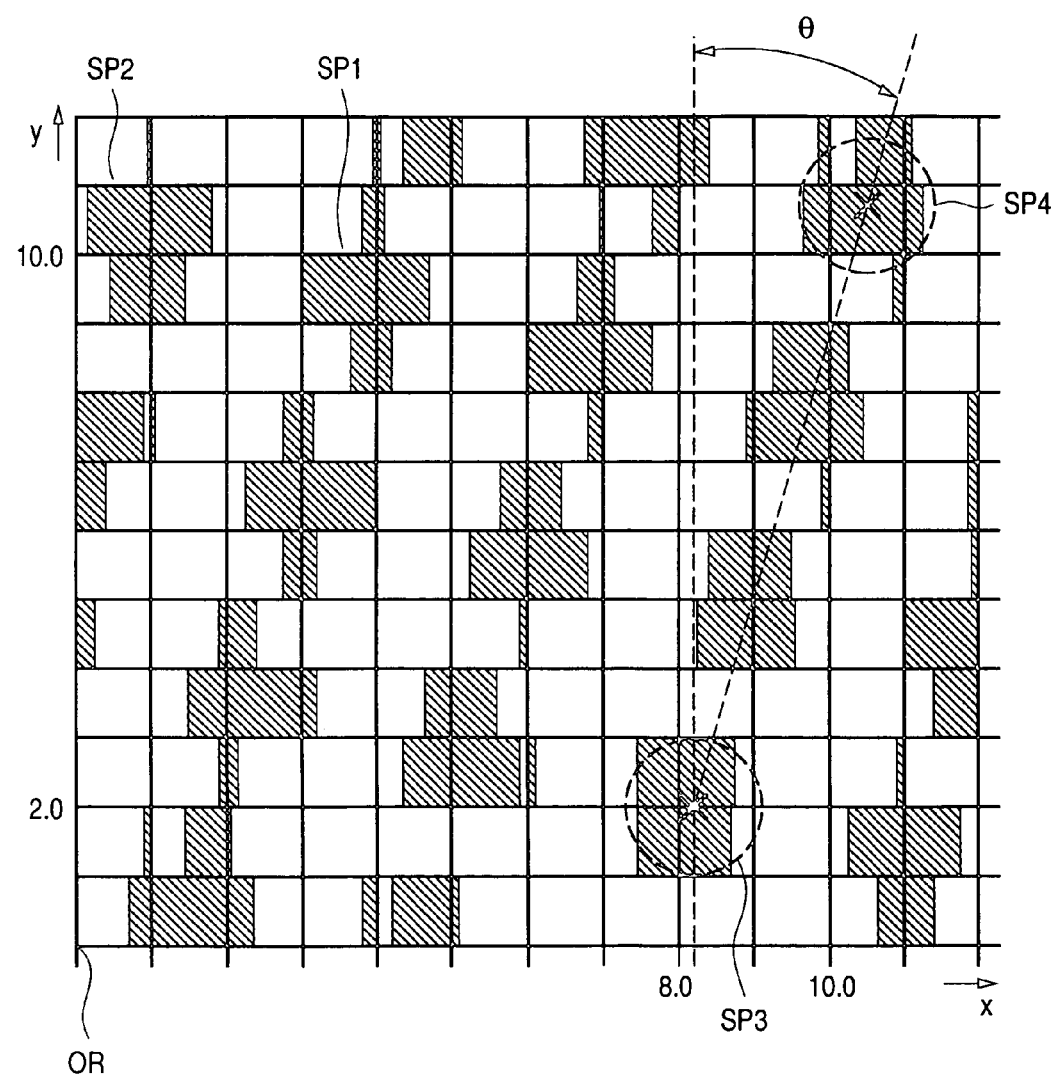
FIG. 6 shows an example of halftone spots which are formed at a screen angle of about 75° and at a pitch of about 3 dots.

FIG. 6 shows an example of halftone spots which are formed at a screen angle of about 75° and at a pitch of about 3 dots by utilization of the aforementioned principle. The example shown in FIG. 6 is formed by utilization of a pattern matrix having 12 rows and 12 columns. Although in the illustrated example a plurality of halftone spots grow, the halftone spot SP1 is identical with, for example, the halftone spot shown in FIG. 5.

Given that the horizontal direction with reference to the point of origin OR located at the lower left end is taken as the X axis and the vertical direction with reference to the same is taken as the Y axis, the coordinates of the halftone spot SP3 are set to (8.2, 2.0), and the coordinates of the halftone spot SP4 are set to (10.5, 10.7). The angle θ of a line connecting the two halftone spots SP3 and SP4 is 14.81°. Therefore, screen angle (90°-θ) is about 75°. The distance between the two halftone spots SP3 and SP4 is 9.0 dots long. Since two halftone spots exist between the halftone spots SP3 and SP4, the pitch between the halftone spots assumes a pitch of 3.0 dots.

Figure 1:
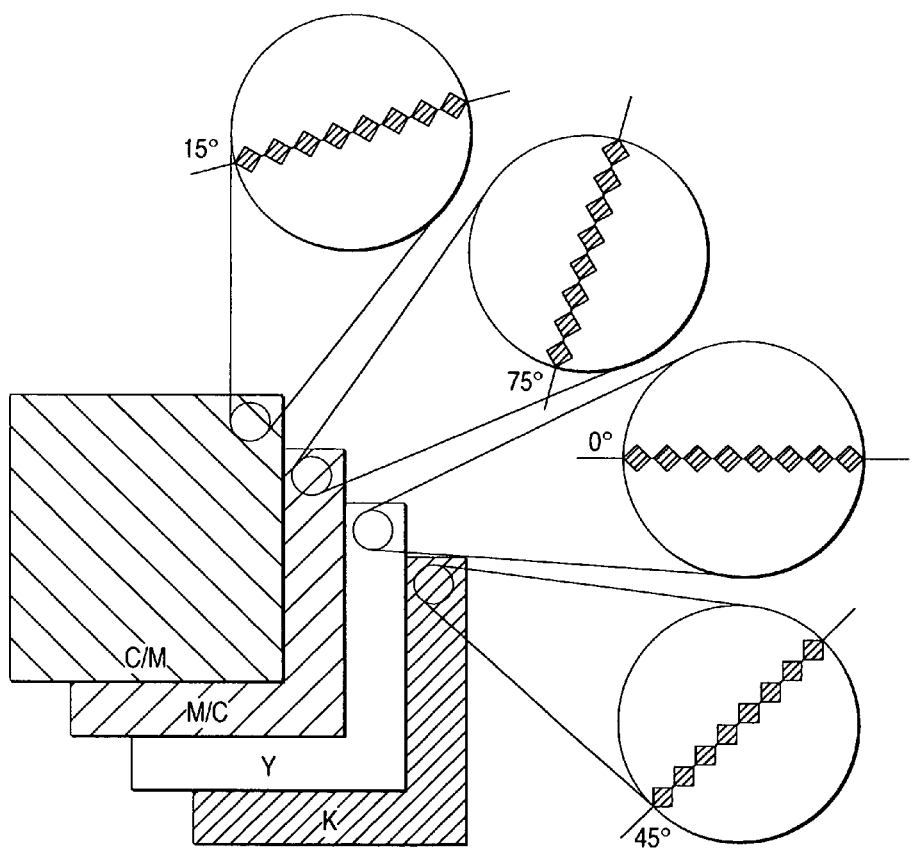
FIG. 1 is an illustration showing the combination of the angle of a cyan screen, the angle of a magenta screen, the angle of a yellow screen, and the angle of black screen, which has conventionally been used in wide applications of industrial printing systems.

A screen angle of 75° is usually related to an irrational tangent (i.e., a tangent which is an irrational number). Angles related to the irrational tangent cannot be reproduced, so long as a limited number of dots are utilized. As described in Japanese Patent Application No. Hei. 11-28666, which is incorporated herein by reference, a development region is formed at a predetermined location within dots and to a predetermined area by utilization of the multivalued dithering method. As a result, even in the case of an electrophotographic engine which produces an image at, for example, as low density as 600 dpi or thereabouts, the centroid of the halftone spot can be adjusted to an arbitrary position within dots. Thus, the screen angle can be set to the angle related to the irrational tangent. The multivalued dithering method enables realization of an angle related to the irrational tangent, such as a screen angle of 15° or a screen angle of 75° shown in FIG. 1, through use of an engine which realizes a low dot density. Further, the multi-valued dithering method enables a halftone spot pitch of each of the color screens to be set to an arbitrary distance, thus rendering the pitch of halftone spots among screens of different colors equal.

The surface potential of the latent image, which is formed on the photosensitive drum by exposure to the laser beam, differs according to an exposure time. The area exposed to the laser beam for a short period of time has a low surface potential. The longer the time photosensitive drum is exposed to the laser beam, the higher the surface potential of the exposed region. As described in connection with the scanning direction of the laser beam by reference to FIG. 6, in a case where the virtual development region to be exposed to a laser beam is comparatively narrow, the time required for exposing the virtual development region to the laser beam becomes shorter. Hence, the resultant latent image assumes a surface potential level that is not very high. Conversely, in a case where the virtual development region to be exposed to a laser beam is comparatively thick, the time required for exposing the photosensitive drum to the laser beam becomes long, thus enabling generation of a latent image having a sufficient surface potential. As a result, a real development region formed as a result of toner adhering to the virtual development region tends to become narrower as the virtual development region becomes thinner, and tends to become wider as the virtual development region becomes thicker.

FIG. 7 shows explanatory views for describing the relationship between the virtual development region and the actual development region. FIG. 7(A) shows a drive pulse signal for activating the laser beam to be radiated onto the virtual development region, wherein the horizontal axis represents the scanning direction of a beam and the vertical axis represents the voltage of a drive pulse. FIG. 7(A) shows a drive pulse signal DP1 (designated by a solid line) having a narrow pulse width t1, a drive pulse signal DP2 (designated by a chain line) whose pulse width t2 is greater than the pulse width t1, and a drive pulse signal DP3 (designated by a broken line) having a sufficiently large width t3. By means of the drive pulse signals, the laser beam being scanned is radiated onto the photosensitive drum, and hence, the width of the drive pulse signal corresponds to the width of the virtual development region.

FIG. 7(B) shows the surface potential of the latent image formed on the photosensitive drum when the photosensitive drum is exposed to the laser beam according to the three types of drive pulse signals. In a case where the photosensitive drum is exposed to the laser beam according to the drive pulse signal DP1, the latent image is formed in a short period of exposure time and assumes a surface potential level that is not very high; that is, a surface potential V1 (designated by a solid line). In a case where the photosensitive drum is exposed to the laser beam according to the drive pulse signal DP2, the latent image is formed in a comparatively long period of exposure time and assumes a sufficiently high surface potential level; that is, a surface potential V2 (designated by a chain line). In a case where the photosensitive drum is exposed to the laser beam according to the drive pulse signal DP3, the latent image is formed in a longer period of exposure time and assumes a fixed constant surface potential level; that is, a surface potential V3 (designated by a broken line). The reason for this is that since the laser beam is moved to scan at a constant speed, the time during which the virtual development region is exposed to the laser beam does not exceed a certain period of time.

FIG. 7(C) shows a real development region formed when the photosensitive drum is exposed to the laser beam according to the three types of the drive pulse signals. As shown in FIG. 7B, the distribution of the surface potentials developing in the latent image varies in accordance with the width of the drive pulse or the width of the virtual development region. If charged toner is caused to adhere to the latent image whose surface potential distribution is varied, to thereby form a real development region, the latent image assumes a low surface potential level (V1) if the virtual development region has a narrow width (DP1), and hence the width D1 of the real development region 11 becomes narrower than the width of the virtual development region. In contrast, in the case of the virtual development regions having sufficient widths (DP2 and DP3), the latent images assume sufficiently high surface potential levels (V2 and V3), and hence the widths D2 and D3 of the real development regions 12 and 13 become substantially the same as that of the virtual development region.

FIG. 8 shows examples of the virtual development regions and the real development regions. FIG. 8(A) illustrates, as an example, the halftone spot SP2 represented by the example shown in FIG. 6, and FIG. 8(B) illustrates, as an example, the halftone spot SP1 represented by the example shown in FIG. 6. Each of the halftone spots SP1 and SP2 is formed from six dots D1 to D6. The halftone spot SP2 shown in FIG. 8(A) is characterized in that a very narrow region R1 is formed in the dot D1. In comparison, the halftone spot SP1 shown in FIG. 8(B) is characterized in that a comparatively wide development region is formed by connection of a narrow region R2 formed in the dot D1 to a narrow region R3 formed in the dot D2.

As illustrated in FIG. 8(A), the halftone spot SP2 has the narrow region R1 within the virtual development region. As a result, a corresponding real development region lacks the narrow region R1. As shown in FIG. 8(B), since the halftone spot SP1 does not have any narrow region in the virtual development region, the real development region and the virtual development region are formed so as to assume substantially the same geometry. The halftone spots shown in FIG. 6 correspond to 144 dots, all of which grow on the basis of the same halftone data. However, as shown in FIGS. 8(A) and 8(B), in terms of actual formation of a development region, the halftone spot SP2 having the narrow region R1 in the virtual development region becomes smaller than the halftone spot SP1. The narrow region R1 formed in the virtual development region is formed by exposing the photosensitive drum to the laser beam for a short period of exposure time. Toner does not sufficiently adhere to such a narrow region R1, and hence the narrow region is developed narrowly or remains substantially undeveloped in the real development region. Such a phenomenon is considered to arise in a range where colors have comparatively low gray-scale levels. If a color has a low gray-scale level, there is an increase in the probability of a narrow region being formed in the virtual development region of the halftone spot. Accordingly, variations arise in the size of halftone spots formed in a skin color region of an image produced by the electrophotography, and the human eye perceives such variations as stripes or irregularities.

Figure 9:
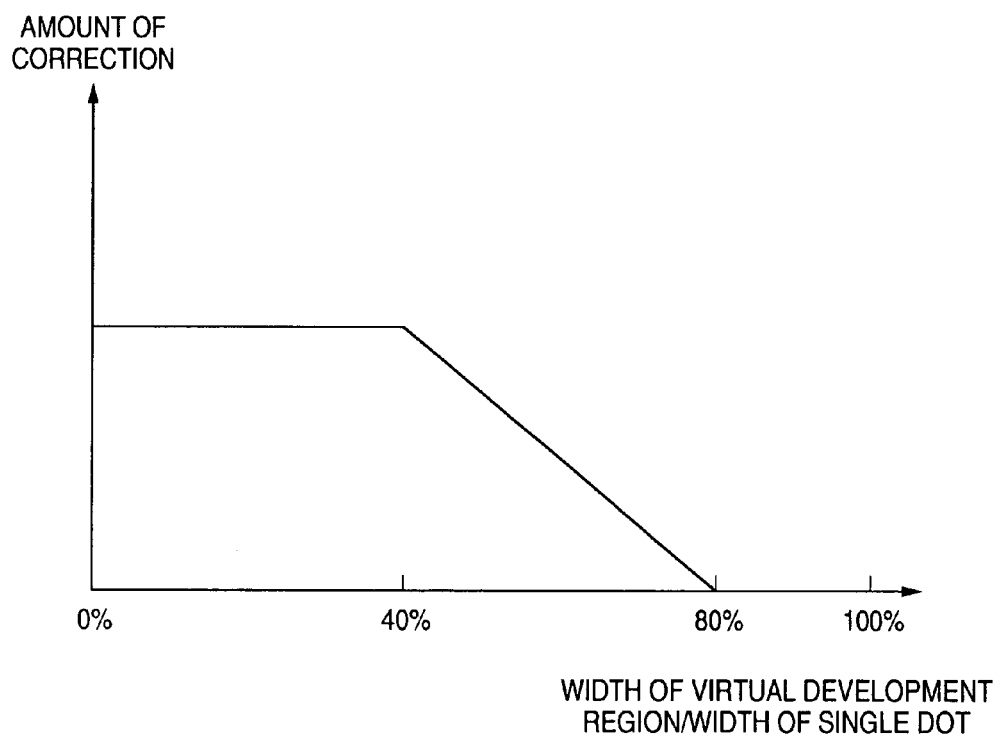
FIG. 9 is a graph showing an example of the amount of correction for preventing a narrow region from being developed more narrowly.

FIG. 9 is a graph showing an example of the amount of correction required for preventing a narrow region from being developed more narrowly. In the present embodiment, in order to prevent occurrence of the foregoing phenomenon, a drive pulse signal for determining the virtual development region is corrected such that the duration of a drive pulse signal having a narrow duration becomes wider, and the drive pulse signal having a long duration is not subjected to such a correction operation. FIG. 9 shows a method of correcting a drive pulse signal. In FIG. 9, the horizontal axis represents the proportion of the width of a virtual development region with respect to the width of a single dot (i.e., the width of a drive pulse), and the vertical axis represents the amount of correction. With regard to portions of the virtual development region where the virtual development region assumes a value of under about 40% of the width of a single dot, a predetermined amount of correction is uniformly added to the drive pulse signal. Accordingly, the widths of the virtual development regions are increased uniformly. In contrast, with regard to portions of the virtual development region where the virtual development region assumes a value ranging from 40% to 80% of the width of a single dot in the virtual development region, a drive pulse signal is corrected such that the amount of correction becomes gradually smaller.

As a result of the drive pulse signal being subjected to a correction as shown in FIG. 9, the virtual development region which is originally designated to become narrow is formed so as to become wider than the virtual development region which is not corrected. In the example shown in FIG. 8, the region R1 of the halftone spot SP2 becomes comparatively wide and is exposed to the laser beam for a comparatively long period of time. The region R4 of the halftone spot SP1, which is formed by means of connecting together the narrow regions R2 and R3, is comparatively wide, and hence a value that is not very large is added to the drive pulse signal for correction. Hence, the region R4 is not formed so widely in the virtual development region.

As mentioned above, the region R1 of the halftone spot SP2 in the virtual development region is made thick, to thereby prevent the real development region to which toner adheres from becoming much narrower in the region R1. Further, since the width of the region R4 of the halftone spot SP1 in the virtual development region does not change much, the region R4 does not become thick in the real development region to which toner adheres. Consequently, the halftone spot SP2 becomes wider than the halftone spot SP1 in the virtual development region, but in the actual development region the halftone spot SP1 and SP2 become substantially equal to each other.

The correction exemplified in FIG. 9 is effected by a front stage of a pulse-width modulation section 68 provided in the controller 62 of the electrophotographic apparatus shown in FIG. 2. The halftone processing section 66 determines the position and area (width) of the virtual development region of each dot. In a case where a laser beam is continuously radiated across adjacent dots, such as the regions R2 and R3 of the halftone spot SP1 shown in FIG. 8, the width of the laser drive pulse signal used for exposing the region R4 corresponding to a combination of the regions R2 and R3 is preferably subjected to the correction operation shown in FIG. 9. More specifically, there is provided a correction table such as that shown in FIG. 9, and by reference to the correction table, a pulse signal having a narrower width is subjected to greater correction. The thus-corrected final drive pulse signal 69 is supplied to the laser driver 72.

Figure 10:
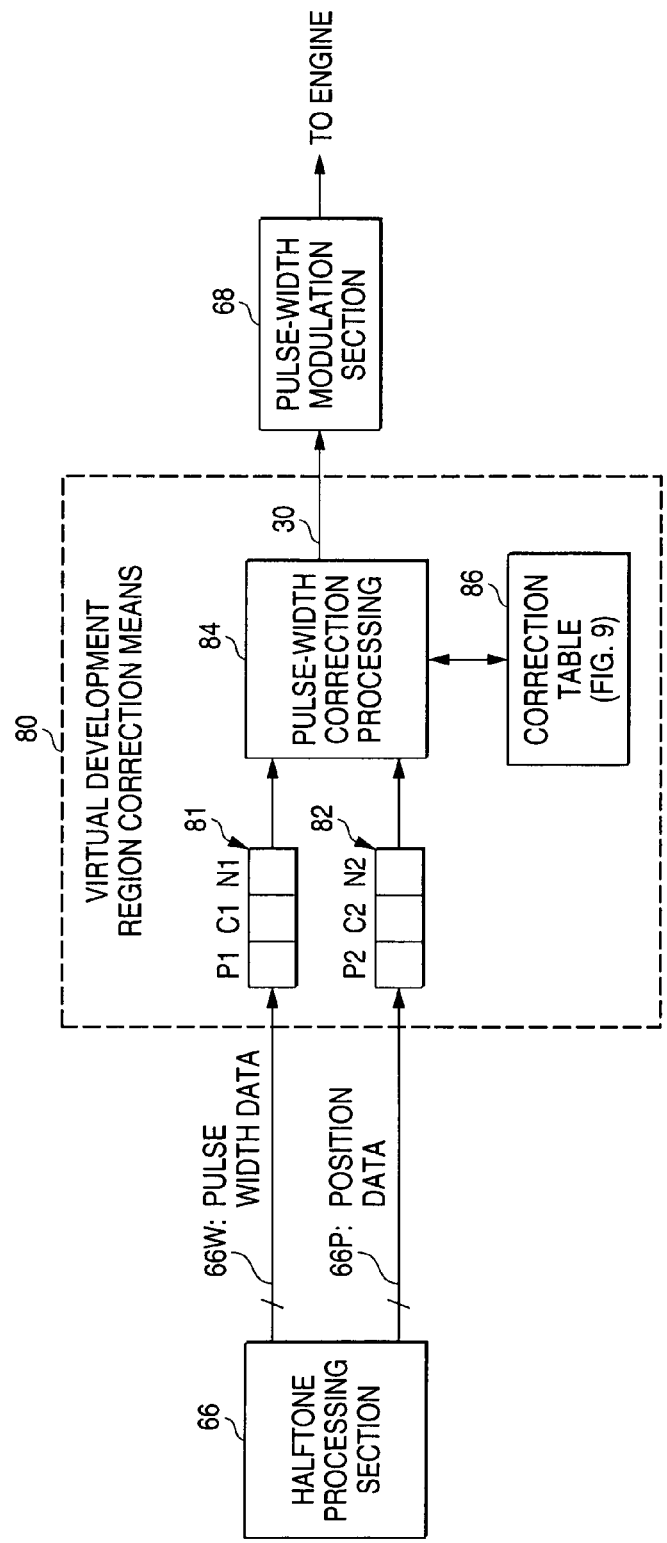
FIG. 10 is a block diagram showing virtual development region correction means.

FIG. 10 is a block diagram showing correction means for correcting the virtual development region. Virtual development region correction means 80 is provided in front of the pulse-width modulation section 68. The halftone processing section 66 supplies pulse-width data 66W for each dot, and position data 66P pertaining to whether a pulse signal is to activate the laser beam so as to scan across the left side or right side of the dot with respect to the primary scanning direction or is to activate the laser beam so as to scan across the entire dot. The virtual development region correction means 80 is equipped with a dot data buffer 81 for temporarily recording the pulse-width data 66W, as well as a dot data buffer 82 for temporarily recording the position data 66P. Each of the dot data buffers 81 and 82 reserves the pulse-width data 66W and the position data 66P with regard to three consecutive dots. More specifically, in the dot data buffer 81 there are ensured buffer regions for recording the pulse-width data 66W and the position data 66P with regard to a current dot C1, a previous dot P1, and a next dot N1. Similarly, in the dot data buffer 82 there are ensured buffer regions for recording the pulse-width data 66W and the position data 66P with regard to a current dot C2, a previous dot P2, and a next dot N2. The pulse-width data 66W and the position data 66P, both pertaining to a new dot, are recorded in the next dot region N1 or N2 and are sequentially shifted to the current dot region C1 or C2 and the previous dot region P1 or P2.

On the basis of the data pertaining to the three consecutive dots recorded in the dot data buffers 81 and 82, a pulse-width correction processing section 84 detects the width of each of the virtual development regions R1 and R4, which are described in FIG. 8 and each of which is formed by connection of a plurality of adjacent virtual development region. By reference to the correction table 86 shown in FIG. 9, the amount of correction to be applied to the regions R1 and R4 is determined, whereby the amount of correction to be applied to the current dot is determined. According to the thus-determined amount of correction, the pulse-width correction processing section 84 corrects the width of the laser drive pulse signal and supplies the image reproduction data 30 to the pulse-width modulation section 68.

FIG. 11 is a table showing an algorithm used by the pulse-width correction processing section 84 for detecting the entire width of a laser drive pulse signal for radiating adjacent dots. The position data 66P pertaining to a dot produced by the halftone processing section 66 comprise "left" position data pertaining to a dot to be formed in the left-side area of a development region, "right" position data pertaining to a dot to be formed in the right-side area of the development region, and "entire" position data pertaining to a dot to be formed over the entire development region. The dot data buffer 82 reserves position data pertaining to the previous dot, the current dot, and the next dot. Further, the dot data buffer 81 reserves, as data pertaining to pulse widths, the pulse width "p" relating to the previous dot, the pulse width "c" relating to the current dot, and the pulse width "n" relating to the next dot.

The table shown in FIG. 11 provides a list of all the combinations of the "left" position data, the "right" position data, and the "entire" position data and shows the total pulse widths for the respective combinations. For instance, in case 1 wherein the previous dot "prev" is related to "right" position data, the current dot "curr" is related to "right" position data; and the next dot "next" is related to "right" position data, the development regions of the respective dots are spaced apart from one another. Therefore, the total pulse width relating to the current dot corresponds to the pulse width "c", relating to the current dot. As in cases 2 and 3 wherein the current dot "curr" is related to "right" position data and the next dot "next" is related to "left" or "entire" position data, the development region of the current dot is adjacent to the development region of the next dot, and hence the total pulse width relating to the current dot corresponds to "c+n."

In a case where the current dot "curr" is related to "entire" position data, the previous dot "prev" is related to "right" or "entire" position data, and the next dot "next" is related to "left" or "entire" position data, the total pulse width relating to the current dot corresponds to a pulse width "p+c+n," as represented by, for example, cases 8, 9, 26, and 27.

When the total width of the laser drive pulse signal is determined according to the table provided in FIG. 11, the pulse-width correction processing section 84 determines the amount of correction corresponding to the total width of the pulse signal represented by the horizontal axis (more specifically, a proportion of the total pulse width to the width of a single dot), by reference to the correction table 86 shown in FIG. 9. According to Equation (1) provided below the table shown in FIG. 11, the amount of correction to be applied to the current dot is determined as a proportion of the amount of correction to be applied to the total pulse width to the amount of correction to be applied to the pulse width relating to the current dot (i.e., the amount of correction to be applied to the current dot=c÷total pulse width×the amount of correction to be applied to the total pulse width). The thus-determined amount of correction is added to the pulse width for the current dot, as the amount of correction. According to Equation 1, the amount of correction—which is determined by means of allocating the amount of correction to be applied to the total pulse width while the pulse widths of adjacent dots are taken as weighting values—is added to the pulse width relating to each dot.

In a case where the correction table shown in FIG. 9 is represented by the ratio of an increase to the pulse width, utilization of Equation (1) is not required. The only requirement is that the pulse width for each dot be multiplied by simply the ratio of an increase. Either of the methods may be employed.

FIGS. 12 and 13 are schematic representations for describing the method of determining the amount of correction, which has been described in connection with the table shown in FIG. 11 and Equation (1). By reference to FIG. 12, there will be described the correction which is performed by the correction means 80 shown in FIG. 10 by taking a dot D0 previous to D1 and a dot D21 next to D2 with regard to the primary scanning direction into consideration.

In the case (1) shown in FIG. 12, the width of the pulse signal relating to the previous dot is zero, and the total width of the pulse signal corresponds to the sum of the pulse width "c" relating to the current dot "curr" and the pulse width "n" relating to the next dot "next"; that is, "c+n." Accordingly, the amount of correction to be applied to the current dot "curr" assumes a value determined by multiplying the amount of correction to be applied to the total pulse width "c+n" by "c/(c+n)," as illustrated in the drawing. The thus-determined amount of correction is applied to the width of the pulse signal for the current dot.

In the case (2) shown in FIG. 12, the next dot D2 provided in the case (1) corresponds to the current dot "curr." In this case, a pulse width relating to the dot D21 corresponding to the next dot "next" is assumed to take a value of zero. A value determined by multiplying the amount of correction to be applied to the total pulse width "p+c" by "c/(p+c)" is taken as the amount of correction applied to the dot D2 corresponding to the current dot "curr."

In the case (3) shown in FIG. 13, a pulse width relating to the current dot "curr" is equal to the width of the current dot "curr," a pulse signal relating to the previous dot "prev" is offset rightward, and a pulse signal relating to the next dot "next" is offset leftward. The case (3) corresponds to case 9 provided in the table shown in FIG. 11. A value determined by multiplying the amount of correction to be applied to the total pulse width "p+c+n" by "c/(p+c+n)" is added, as the amount of correction to be applied to the current dot, to the pulse width relating to the current dot.

In the case (4) shown in FIG. 13, pulse signals are generated such that both the left-side and right-side regions of the current dot are exposed to the laser beam. An example corresponding to such a case (4) is not provided in the table shown in FIG. 11. In a case where for some reason pulse signals are desired to be generated such that the left-side and right-side regions of the current dot are exposed, the amount of correction to be applied to pulse widths CL and CR of the pulse signals is determined. More specifically, there are determined the amount of correction to be applied to the sum "p+CL" of the pulse width "p" of the previous dot "prev" and the pulse width CL, as well as the amount of correction to be applied to the sum "CR+n" of the pulse width "n" of the next dot "next" and the pulse width CR. The amount of correction to be applied to the pulse width "p+CL" is multiplied by a proportion of the pulse width CL to the pulse width "p+CL," thus determining the amount of correction (4p). Similarly, the amount of correction to be applied to the pulse width "CR+n" is multiplied by a proportion of the pulse width CR to the pulse width "CR+n," thus determining the amount of correction (4n). The thus-determined amount of correction (4p) is added to the pulse width CL relating to the left region, and the thus-determined amount of correction (4n) is added to the pulse width CR relating to the right region.

The virtual development region correction means 80 applies correction, as required, to the width of the laser drive pulse signal such that the width of the virtual development region formed from a plurality of adjacent dots becomes thicker than that of the virtual development region which is originally designated to be. More specifically, the width of the virtual development region of each color space is corrected according to a correction table such as that provided in, for example, FIG. 9. As a result, the same real development region is formed on the data of the same gray-scale level. The virtual development region correction means 80 is provided in each of CMYK color spaces.

The correction to be applied to a development region shown in FIG. 9 may be effected on the basis of the γ table provided in the halftone processing section 66. More specifically, when being subjected to the correction shown in FIG. 9, the γ table designated by the solid line shown in FIG. 4 becomes, for example, a γ table designated by a broken line, as shown in FIG. 4. Since the development region is corrected by utilization of such a γ table such that a greater output is produced in the area where a small output is originally designated to be produced, thus rendering a narrow virtual development region wider. In this case, preparation of the γ table designated by a broken line must be performed by application of appropriate correction to the width of the virtual development region, after a check has been made as to whether or not the virtual development region comprises continuous adjacent dots.

The virtual development region where dots are exposed to a laser diode assumes different areas with respect to data of the same gray-scale level, without regard to whether the width of the virtual development region is corrected by means of the halftone processing section 66 or the pulse-width modulation section 68. The reason for this is that a narrow region constituting a halftone spot is corrected so as to become thicker. The virtual development region is controlled so as to assume substantially the same area of halftone spots as those assumed by the real development region which is finally formed by adhesion of toner, with regard to the data of the same gray-scale level, thereby preventing occurrence of stripes or inconsistencies, which would otherwise be caused by variations in the area of halftone spots.

FIG. 14 is a block diagram showing another electrophotographic system. This system is a modification of the electrophotographic system shown in FIG. 2. The electrophotographic system shown in FIG. 14 comprises a printer driver 90 installed in the host computer 50, the rasterizing driver 54, the color conversion section 64, and the halftone processing section 66. The rasterizing driver 54, the color conversion section 64, and the halftone processing section 66 are the same as those elements assigned the same reference numerals shown in FIG. 2. Image reproduction data (pulse-width data) 30 produced for each color by the halftone processing section 66 are supplied to the pulse-width modulation section 68 of the controller 62 provided in the electrophotographic apparatus 60, such as a page printer. The image reproduction data 30 are converted into desired drive data 69 and are supplied to the engine 70.

In the example of the electrophotographic system shown in FIG. 14, the printer driver 90 installed in the host computer 50 performs color conversion processing and halftone processing. In the example of the electrophotographic system shown in FIG. 2, the controller 62 provided in the electrophotographic system 60 performs color conversion processing and halftone processing. In comparison, in the example shown in FIG. 14, the host computer 50 performs color conversion processing and halftone processing. In a case where demand for a cheaper electrophotographic apparatus 60 exists, the price of the electrophotographic apparatus 60 is required to be reduced by degrading the capability of the controller 62. In such a case, implementing the color conversion processing and the halftone processing, which constitute a portion of the functions performed by the controller 62 shown in FIG. 2, through use of a driver program installed in the host computer 50 is effective. In a case where the printer driver 90 fulfils halftone processing, a storage medium having stored therein a program for causing a computer to perform halftone processing procedures is incorporated in the host computer 50.

In the case of the electrophotographic system shown in FIG. 14, the width of the virtual development region can be effected through utilization of the γ table formed by means of correction of the γ table provided in the halftone processing section 66, as in the case of the example shown in FIG. 2. The width of the virtual development region may be corrected in the same manner as in the previously-described case, even in a case where a virtual development region correction section such as that shown in FIG. 10 is provided in the front stage of the pulse-width modulation section 68 provided in the controller 62 of the electrophotographic system shown in FIG. 14, as well as where drive pulse data corrected so as to correspond to the pulse width are imparted to the laser driver 72.

As mentioned above, the present embodiment is directed to an electrophotographic apparatus which represents halftone by utilization of a halftone spot formed of a plurality of dots. In such an electrophotographic apparatus, in the virtual development region where a halftone spot is exposed to a laser beam a narrow dot region is made wider than it would originally designated to be. In a real development region where toner is caused to adhere to the resultant latent image, the narrow region is prevented from becoming narrower. In contrast, a dot region having a certain degree of thickness in the virtual development region is not subjected to correction and remains in its original form, to thereby prevent the dot region from becoming much thicker.

As has been described above, since a narrow dot region is corrected so as to become thicker in the virtual development region, the actual development region can be finally made equal in size to a halftone spot of the same gray-scale level, thereby preventing occurrence of stripes or inconsistencies in the resultantly-produced image.

What is claimed is:

1. An electrophotographic apparatus, which utilizes toner of a plurality of colors and represents a halftone of each color through use of halftone spots, thereby to reproduce an image, each halftone spot being formed of a plurality of dots, said apparatus comprising:

a halftone processing section which produces image reproduction data having area and location in terms of a virtual development region within said dots based on halftone data corresponding to each of said plurality of dots, by reference to a conversion table;

the conversion table being formed so as to correspond to the dots, and defining a correspondence between the halftone data pertaining to respective colors and image reproduction information; and an image reproduction engine which produces a latent image by radiation of a beam onto said virtual development region within the dots, and causes the toner to adhere to the latent image, to thereby form a real development region, wherein at least one halftone spot has a different area of the virtual development region from an area of the virtual development region of another halftone spot while the real development regions of said at least one halftone spot and of said another halftone spot have a substantially same area, with respect to a single halftone level.

2. An electrophotographic apparatus according to claim 1, wherein at least one said virtual development region, which is to be exposed to the beam and constitutes the halftone spot, is set to assume a theoretical thickness or greater.

3. An electrophotographic apparatus according to claim 1, wherein;

in a case where a theoretical thickness of the virtual development region, which is to be exposed to the beam and constitutes the halftone spot, is narrower than a predetermined thickness, the virtual development region is corrected so as to be greater than the theoretical thickness, and in a case where the theoretical thickness of the virtual development region is thicker than the predetermined thickness, the virtual development region is not corrected.

4. An electrophotographic apparatus according to claim 3, wherein a conversion table, which the halftone processing section refers to, is subjected to said correction operation.

5. An electrophotographic apparatus according to claim 3, wherein a drive pulse signal, to be sent to beam generation means provided in the image reproduction engine, is subjected to said correction operation.

6. An electrophotographic apparatus according to claim 3, wherein the virtual development region, which is to be exposed to the beam and constitutes the halftone spot, is corrected so as to be greater than originally designated to become, according to a thickness of the virtual development region.

7. An electrophotographic apparatus according to claim 1, further comprising:

virtual development region correction means for applying correction corresponding to a width of the virtual development region formed from the plurality of adjacent dots, to data pertaining to a width of a beam drive pulse signal for each dot which is included in the image reproduction data produced by the halftone processing section.

8. An electrophotographic image processing method of utilizing toner of a plurality of colors and representing a halftone of each color through use of halftone spots formed of a plurality of dots, to thereby reproduce an image, said method comprising:

a halftone processing step of producing image reproduction data having area and location, in terms of a virtual development region within said plurality of dots based on the halftone data corresponding to each of said plurality of dots, by reference to a conversion table which is formed so as to correspond to the dots and defines the correspondence between the halftone data pertaining to respective colors and image reproduction information; and an image reproduction step of producing a latent image by radiation of a beam onto said virtual development region within the dots, and causing the toner to adhere to the latent image, to thereby form a real development region, wherein an area of the virtual development region of at least one halftone spot is different, from each of areas of the virtual development regions of other halftone spots having substantially the same areas, in terms of the real development region with respect to a single halftone level.

9. A computer readable medium having recorded thereon an image processing program, for use with an electrophotographic apparatus utilizing toner of a plurality of colors and representing a halftone of each color through use of halftone spots to thereby reproduce an image, each halftone spot being formed of a plurality of dots, the apparatus having an image reproduction engine adapted to produce a latent image by radiation of a beam onto a virtual development region within the dots and causing the toner to adhere to the latent image to thereby form a real development region, the image processing program causing a computer to perform halftone processing procedures comprising:

producing image reproduction data having area and location in terms of a virtual development region, within said dots, based on a halftone data corresponding to each of said plurality of dots, by reference to a conversion table which is formed so as to correspond to the dots and defines the correspondence between the halftone data pertaining to respective colors and image reproduction information, wherein an area of the virtual development region of at least one halftone spot is different, from each of the areas of the virtual development regions of the other halftone spots having substantially the same areas, in terms of the real development region with respect to a single halftone level.

10. An electrophotographic apparatus which utilizes toner of a plurality of colors and represents a halftone of each color through use of halftone spots each formed of a plurality of dots, to thereby reproduce an image, said apparatus comprising:

a halftone processing section which produces image reproduction data pertaining to the dots for respective colors based on halftone data pertaining to respective colors, by reference to a conversion table which is formed so as to correspond to the dots and defines the correspondence between the halftone data pertaining to respective colors and image reproduction information;

virtual development region correction means for applying, as required, correction to data pertaining to a width of a beam drive pulse signal for each dot which is included in the image reproduction data produced by said halftone processing section, such that only narrow areas of the virtual development region formed of the plurality of adjacent dots becomes thicker than it would originally be designated to become; and an image reproduction engine which produces a latent image by radiation of a beam onto a virtual development region within the dots, the region corresponding to the image reproduction data in terms of area and location and causes the toner to adhere to the latent image, to thereby form a real development region.

11. An electrophotographic apparatus which utilizes toner of a plurality of colors and represents a halftone of each color through use of halftone spots each formed of a plurality of dots, to thereby reproduce an image, said apparatus comprising:

a halftone processing section which produces image reproduction data pertaining to the dots for respective colors based on halftone data pertaining to respective colors, by reference to a conversion table which is formed so as to correspond to the dots and defines the correspondence between the halftone data pertaining to respective colors and image reproduction information; and an image reproduction engine which produces a latent image by radiation of a beam onto a virtual development region within the dots, the region corresponding to the image reproduction data in terms of area and location and causes the toner to adhere to the latent image, to thereby form a real development region, wherein said conversion table is corrected such that, as required, correction is applied to data pertaining to a width of a beam drive pulse signal for each dot which is included in the image reproduction data produced by said halftone processing section, such that at least one narrow area of the virtual development region formed of the plurality of adjacent dots becomes thicker than said narrow areas would originally be designated to become, while other areas of the virtual development region are maintained at originally designated respective sizes.

* * * * *